United States Patent
Taylor, Jr. et al.

(10) Patent No.: US 7,316,732 B2
(45) Date of Patent: Jan. 8, 2008

(54) AIR TREATMENT FILTER AND RELATED METHOD

(75) Inventors: Roy M. Taylor, Jr., Rockford, MI (US); Roy W. Kuennen, Caledonia, MI (US); Gregory K. Evans, Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 370 days.

(21) Appl. No.: 11/181,254

(22) Filed: Jul. 14, 2005

(65) Prior Publication Data
US 2007/0012185 A1    Jan. 18, 2007

(51) Int. Cl.
*B01J 20/20* (2006.01)
*A61L 9/01* (2006.01)

(52) U.S. Cl. .......................... 95/141; 95/901; 96/121; 96/132; 422/122; 423/210; 502/417

(58) Field of Classification Search .............. 96/121, 96/131, 132, 135, 153; 95/90, 141, 901; 422/5, 120, 122; 423/210, 245.1; 502/416, 502/417; 424/76.7
See application file for complete search history.

(56) References Cited

U.S. PATENT DOCUMENTS

| | | | |
|---|---|---|---|
| 1,519,740 A | 12/1924 | Wilson et al. | |
| 2,091,696 A | 8/1937 | Von Bramer | |
| 2,464,902 A | 3/1949 | Stuart | |
| 3,876,451 A | 4/1975 | Zall | |
| 4,039,473 A | 8/1977 | Schafer | |
| 4,111,833 A | 9/1978 | Evans | |
| RE31,093 E | 11/1982 | Tolles et al. | |
| 4,370,301 A * | 1/1983 | Doi et al. | 422/122 |
| 4,769,359 A | 9/1988 | Audley et al. | |
| 5,288,306 A * | 2/1994 | Aibe et al. | 95/141 |
| 5,344,626 A * | 9/1994 | Abler | 423/210 |
| 5,346,876 A * | 9/1994 | Ichimura et al. | 502/417 |
| 5,372,619 A | 12/1994 | Greinke et al. | |
| 5,382,559 A | 1/1995 | Carugati et al. | |
| 5,391,534 A | 2/1995 | Carugati et al. | |
| 5,482,915 A | 1/1996 | Golden et al. | |
| 5,772,738 A * | 6/1998 | Muraoka | 96/129 |
| 5,830,414 A | 11/1998 | Ishii et al. | |
| 5,948,398 A | 9/1999 | Hanamoto et al. | |
| 5,955,393 A | 9/1999 | Moskovitz et al. | |
| 5,965,483 A | 10/1999 | Baker et al. | |
| 7,163,573 B2 * | 1/2007 | Ham et al. | 96/131 |
| 2007/0000389 A1 * | 1/2007 | Applegarth et al. | 96/132 |

* cited by examiner

*Primary Examiner*—Frank M. Lawrence
(74) *Attorney, Agent, or Firm*—Warner Norcross & Judd LLP

(57) ABSTRACT

An activated carbon filter that treats a gas stream having a varying relative humidity, the gas stream contaminated with at least one of formaldehyde, an acid gas and an alkaline gas. The filter includes a plurality of activated carbon granules mixed together in a carbon bed filter. A first portion of the granules supports both manganese dioxide and potassium hydroxide. A second portion of the granules supports both potassium iodide and potassium hydroxide. A third portion of the granules supports phosphoric acid. The different portions operate to catalyze the oxidation of formaldehyde and other contaminants at varying humidity. The potassium hydroxide optionally chemisorbs any carboxylic acid by-products of the formaldehyde. Also provided is a method to treat a gas stream with the filter.

22 Claims, 13 Drawing Sheets

AIR TREATMENT FILTER AND RELATED METHOD

BACKGROUND OF THE INVENTION

The present invention relates to filters, and more particularly to air treatment filters including a carbon media.

A variety of air treatment systems exist that remove pollutants, contaminants and harmful chemicals from air in living and work environments. Many of these systems incorporate a filter through which air to be treated passes. This filter usually includes media that removes certain contaminants from the air that passes over or through the filter. One type of media used in such filters is activated carbon.

Activated carbon is effective at removing a variety of contaminants from an air stream. Activated carbon typically has many micro-porous surfaces which facilitate the adherence of the contaminants to those surfaces, thereby removing them from the air stream.

Some manufacturers of air treatment systems have modified the activated carbon media in their filters to enhance the media's ability to remove certain types of contaminants. In a first example, manufacturers have modified individual granules of activated carbon filter media to include potassium iodide. A carbon granule so modified has somewhat improved characteristics of removing a known contaminant, formaldehyde, by catalyzing the formaldehyde to formic acid, and eventually carbon dioxide and water. However, activated carbon including the potassium iodide works well only within specific humidity ranges. In a second example, manufacturers have modified individual granules of activated carbon filter media to include potassium hydroxide which is adapted to remove acidic gases, for example, low molecular weight carboxylic acids, such as butyric acid, valeric acid, isobutyric acid, isovaleric acid and hexanoic acid, from the air stream. In a third example, individual granules of activated carbon filter media have been modified to include phosphoric acid which is adapted to remove alkaline gases, for example, putriscine, indole, skatole, methyl amine, trimethyl amine, and pyridine, from the air stream.

Although these individual granules of media remove the noted contaminants from the air stream, they fail to provide a holistic solution to removing desired contaminants. Further, multiple types of filter media are required in a single filter to ensure the desired contaminants are removed. In turn, this increases the volume of filter material, and thus the size of the filter, which can cause significant design issues for small and/or portable air treatment systems, and can also increase cost of the filter.

SUMMARY OF THE INVENTION

The aforementioned problems are overcome by an activated carbon filter for an air and/or gas treatment system including at least two different types of activated carbon granules: a first granule type supporting both manganese dioxide and potassium hydroxide; a second granule type supporting both potassium iodide and potassium hydroxide; and a third granule type supporting phosphoric acid.

In one embodiment, the first granule type is a primary catalyst for oxidation of contaminants, for example, formaldehyde, acetaldehyde, low molecular weight alcohols, low molecular weight aldehydes, low molecular weight carboxylic acids and other readily oxidized organic compounds, in a gas stream with a relative humidity of greater than about 5%, but less than about 30%. The second granule type is a primary catalyst for oxidation of contaminants, for example, formaldehyde, acetaldehyde, low molecular weight alcohols, low molecular weight aldehydes, low molecular weight carboxylic acids and other readily oxidized organic compounds, in a gas stream with a relative humidity of greater than about 30%. The third granule type is adapted to remove alkaline gas from the gas stream.

In another embodiment, the potassium hydroxide supported by the first and second granule types is a chemisorbant of the formic acid produced when formaldehyde is oxidized by those granule types. The formic acid, which is very volatile, is retained as potassium formate, on the same carbon granule as the catalyst, which allows further oxidation to occur.

In yet another embodiment, the different granule types are distributed in equal volumes in a filter media bed. Optionally, the granules each have an average diameter of greater than about 3 mm. Further optionally, the granules have a cumulative weight of greater than about 1000 grams, greater than about 4000 grams, but optionally less than about 2500 grams.

Also provided is a method for treating an air and/or gas stream with a granular activated carbon filter. The method includes: providing the above noted granule types; subjecting a gas stream having a varying relative humidity and contaminated with at least one of formaldehyde, acetaldehyde, low molecular weight alcohols, low molecular weight aldehydes, low molecular weight carboxylic acids and other readily oxidized organic compounds, an acid gas and an alkaline gas, to the carbon bed filter; catalyzing the oxidation of the at least one of formaldehyde, acetaldehyde, low molecular weight alcohols, low molecular weight aldehydes, low molecular weight carboxylic acids and other readily oxidized organic compounds, primarily with the manganese dioxide supported by the first granule type when the gas stream has a relative humidity of greater than about 5% but less than about 30%; catalyzing the oxidation of the at least one of formaldehyde, acetaldehyde, low molecular weight alcohols, low molecular weight aldehydes, low molecular weight carboxylic acids and other readily oxidized organic compounds, primarily with the potassium iodide supported by the second granule type when the gas stream has a relative humidity of greater than about 30%; removing the acidic gas with the potassium hydroxide supported by the first and second granule types; and removing the alkaline gas with the phosphoric acid supported by the third granule type. Optionally, the method also can be used to reduce the level of acetaldehyde, low molecular weight alcohols, low molecular weight aldehydes, low molecular weight carboxylic acids and other readily oxidized organic compounds.

The carbon filter described herein provides a simple and effective mechanism for quickly and safely removing contaminants, for example formaldehyde, as well as acetaldehyde, low molecular weight alcohols, low molecular weight aldehydes, low molecular weight carboxylic acids and other readily oxidized organic compounds, from a gas stream. First, because the carbon granule types can be loaded with multiple oxidization catalysts and/or chemisorbants, the total volume of filter material can be reduced to save space and cost. Second, a filter including granules having both manganese dioxide and potassium hydroxide can catalyze formaldehyde as well as remove its carboxylic acid byproduct, for example, formic acid. Third, a filter including a carbon supporting manganese dioxide and potassium iodide is effective at removing part or all of a contaminant at varying relative humidity.

These and other objects, advantages and features of the invention will be more readily understood and appreciated by reference to the detailed description of the invention and the drawings.

DETAILED DESCRIPTION OF THE PREFERRED EMBODIMENT

Figure 1:
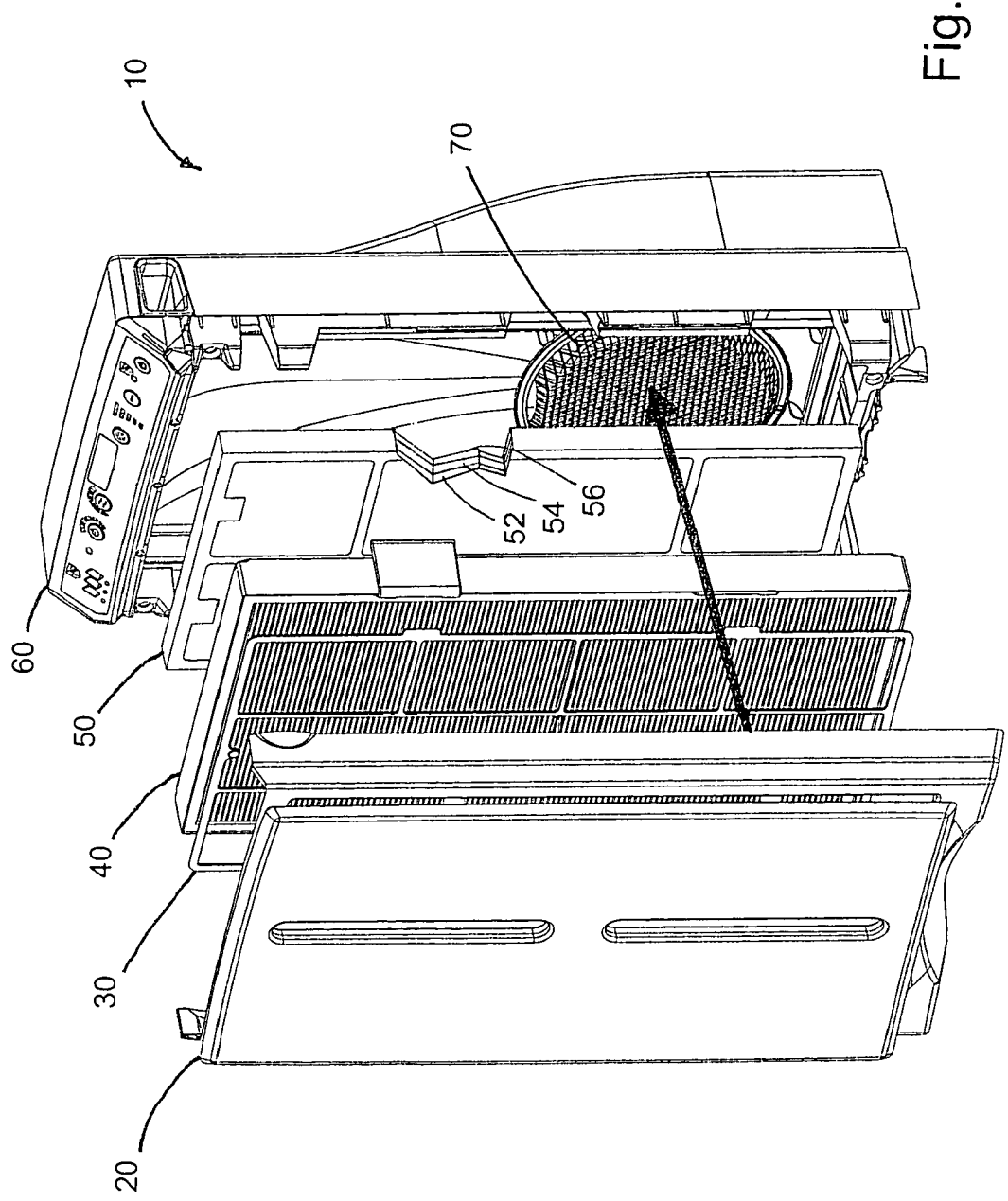
FIG. 1 is a perspective exploded view of an air treatment system including a carbon filter of the present invention.

An air treatment system including an embodiment of the carbon filter is shown in FIG. 1 and generally designated 10. The air treatment system includes a cover 20, a pre-filter 30, a HEPA filter 40, a carbon filter 50, and a housing 60 which includes a fan 70. The fan 70 pulls air through the cover 20, pre-filter 30, HEPA filter 40, and the carbon filter 50, and exhausts the air out from the housing 60. The carbon filter reduces and/or eliminates multiple contaminants from the air as the air traverses the filter. Although shown as a vertical, rectangular bed of filter material, the carbon filter can be of any size or shape depending on the flow of gases through or over the material, and depending on the appropriate residence time.

In one embodiment, the media used in the carbon filter bed includes activated carbon granules from suitable sources such as coconut, coal and wood, or any other source as the application requires. These granules can be of any shape or size, and arranged in any desired configuration. For example, the granules can have an average diameter with a lower limit of: about 2 mm, about 3 mm, about 4 mm, about 5 mm and/or about 6 mm. Further, the amount of carbon granules present in the bed can have a lower limit of: about 900 grams, about 1000 grams, about 1200 grams, about 1500 grams, about 1900 grams, and/or about 2500 grams. The depth of the filter media, i.e., the granules in a bed, can be at least: about 0.125 inches, about 0.25 inches, about 0.3 inches, about 0.375 inches, about 0.4 inches, about 0.5 inches, about 1 inch, and/or any other depth depending on the residence time and or flow of gas through or over the material. The various carbon filter granule types described below can be randomly intermixed within the bed as desired. Optionally, the carbon granules can be provided in a specific sequence so that as a gas flows through or over the carbon granules, it sequentially contacts specific granule types. For example, the carbon granules can be arranged in layers, or separated into different filter elements. One arrangement is shown in FIG. 1, where the carbon filter 50 can include at least two layers, or individual elements, 52 and 54, which comprise activated carbon granules supporting a combination of manganese dioxide and potassium hydroxide (the first layer or element 52), and activated carbon granules supporting a combination of potassium iodide and potassium hydroxide (the second layer or element 54). Optionally, the filter 50 can include another layer or element 56, which comprises activated carbon granules supporting phosphoric acid. The sequence of the filter layers or elements 52, 54 and 56 can be varied as desired.

The activated carbon granules of the filter can be of multiple types. In one embodiment, the granules are of at least two different types. Suitable carbon granules for use as a starting point can be obtained from Jacobi Carbons Ltd., of Seacombe, U.K. One type of carbon granule was treated with potassium permanganate, KMnO4, which reacted with the carbon on the surface of the granule to form manganese dioxide. Thereafter, this first carbon granule supported manganese dioxide. The amount by weight which was supported can have a lower limit of: about 2%, about 3% about 3.3%, about 4%, about 5%, about 6%, about 10%, and about 15%, The same granule was also treated to deposit potassium hydroxide on the surface of the granule. Thus, the first carbon granule also supported potassium hydroxide. The amount of potassium hydroxide supported on the granule can have a lower limit of: about 3.5%, about 4%, about 4.5%, about 5%, about 5.5%, about 6%, about 6.5%, about 7%, about 7.5%, about 8%, about 8.5%, or any desired amount that is sufficient to remove the contaminant. When this type of granule was used in combination with the below granule types and included about 4% manganese dioxide and about 7.5% potassium hydroxide, observed was an increased ability to operate across a variety of humidity (low to high) while not having to significantly increase the volume of carbon media.

A second type of carbon granule used in the filter was treated with potassium iodide so that the carbon granule supports the potassium iodide. The amount by weight percent of potassium iodide supported can have a lower limit of: about 2%, about 2.5%, about 3%, about 3.5%, about 4%, about 4.5%, about 5%, about 6%, about 7%, about 8% or any other desired amount. The same granule also was treated with potassium hydroxide. Thus, the first carbon granule also supported potassium hydroxide. The amount of potassium hydroxide supported on the granule can have a lower limit of: about 3.5%, about 4%, about 4.5%, about 5%, about 5.5%, about 6%, about 6.5%, about 7%, about 7.5%, about 8%, about 8.5%, or any desired amount that is sufficient to remove the contaminant. When this type of granule was treated to include about 6.5% potassium iodide and about 7.5% potassium hydroxide, and used in combination with the aforementioned and below granule types, observed was an increased ability to operate across a variety of humidity while not having to significantly increase the volume of carbon media.

A third type of carbon granule used in the filter was treated with phosphoric acid, $H_3PO_4$, which was dissolved in water, sprayed on the carbon surface, allowed to dry, and was thereafter supported by the carbon granule. The amount by weight percent of phosphoric acid can have a lower limit of: about 5%, about 10%, about 15%, about 20%, about 25%, or any other desired amount. When this granule type was treated to include about 15% phosphoric acid, and used in combination with the other two granule types above, observed was an increased ability to operate across a variety of humidity while not having to significantly increase the volume of carbon media.

In an embodiment of the filter, the media used includes all three of the above filter granule types in equal amounts. In a more specific embodiment, the three granule types each comprise about a third of the filter media.

The following examples are presented for purposes of further illustrating and explaining the filter and are not to be taken as limiting in any regard. Unless otherwise indicated, all temperature measurements are in degree Celsius, and all weights are in percent by weight.

EXAMPLE 1

Testing was conducted to determine efficacy of treating contaminated air streams with activated carbon granules including (a) potassium iodide and potassium hydroxide; and (b) manganese dioxide and potassium hydroxide. As a result of this testing, the following discoveries were made: First, the potassium iodide/potassium hydroxide granules catalytically oxidized formaldehyde. Second, the manganese dioxide/potassium hydroxide treated granules catalytically oxidized formaldehyde as well. Third, the potassium hydroxide supported by the first and second granule types chemisorbed the formic acid that may be produced when the formaldehyde was oxidized by those granules to remove this secondary contaminant. Fourth, the manganese oxide/potassium hydroxide treated carbon consistently performed better than the potassium iodide/potassium hydroxide treated carbons at about 10% relative humidity. Fifth, increasing the humidity increases the performance of potassium iodide/potassium hydroxide treated carbon, but has little impact on manganese dioxide/potassium hydroxide treated carbon, and thus the manganese dioxide/potassium hydroxide treated carbon works synergistically with the potassium iodide/potassium hydroxide carbons to provide contaminant removal across a spectrum of humidity. Finally, at 30% relative humidity the potassium iodide/potassium hydroxide and manganese oxide/potassium hydroxide carbons function roughly equivalently.

Although testing was performed primarily with formaldehyde, it was extrapolated that other compounds having chemical structures and properties similar to formaldehyde—such as acetaldehyde, low molecular weight alcohols, low molecular weight aldehydes, low molecular weight carboxylic acids and other readily oxidized organic compounds—would be treated by the granules of the carbon filter in a manner and with an efficiency similar to that of formaldehyde.

In conducting the tests, samples of the two different carbon types were prepared. The first carbon was treated to support the manganese dioxide (3.3%)/potassium hydroxide (7.5%), and the second carbon was treated to support potassium iodide (3.5%)/potassium hydroxide (7.5%) as described above. These carbons were each ground and sieved through an 18×20 mesh and separately packed in small beds, 1" in diameter by 0.375" deep. These columns were exposed to 10 liters per minute of air contaminated with 10 ppm formaldehyde unless otherwise noted. The use of compressed air was used to produce a low relative humidity of about 10% in the testing.

The concentration of formaldehyde in the influent and effluent was monitored with a Gas Detector TG-KBP, manufactured by Bionics Instrument Company, available from CEA Instruments Company of Emerson, N.J.

Figure 2:
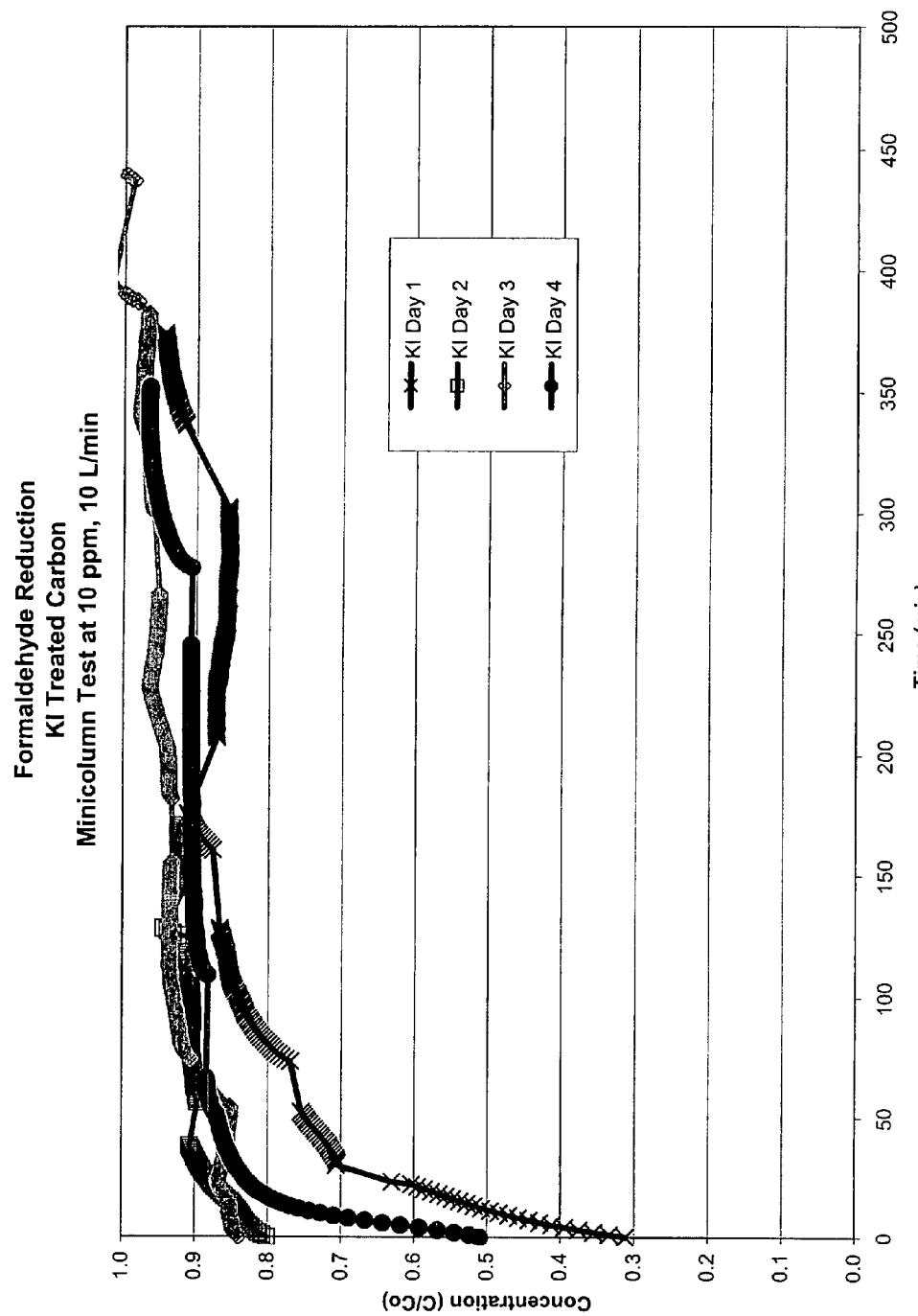
FIG. 2 is a graph showing formaldehyde reduction performance of potassium iodide/potassium hydroxide carbon granules of the filter.
Figure 3:
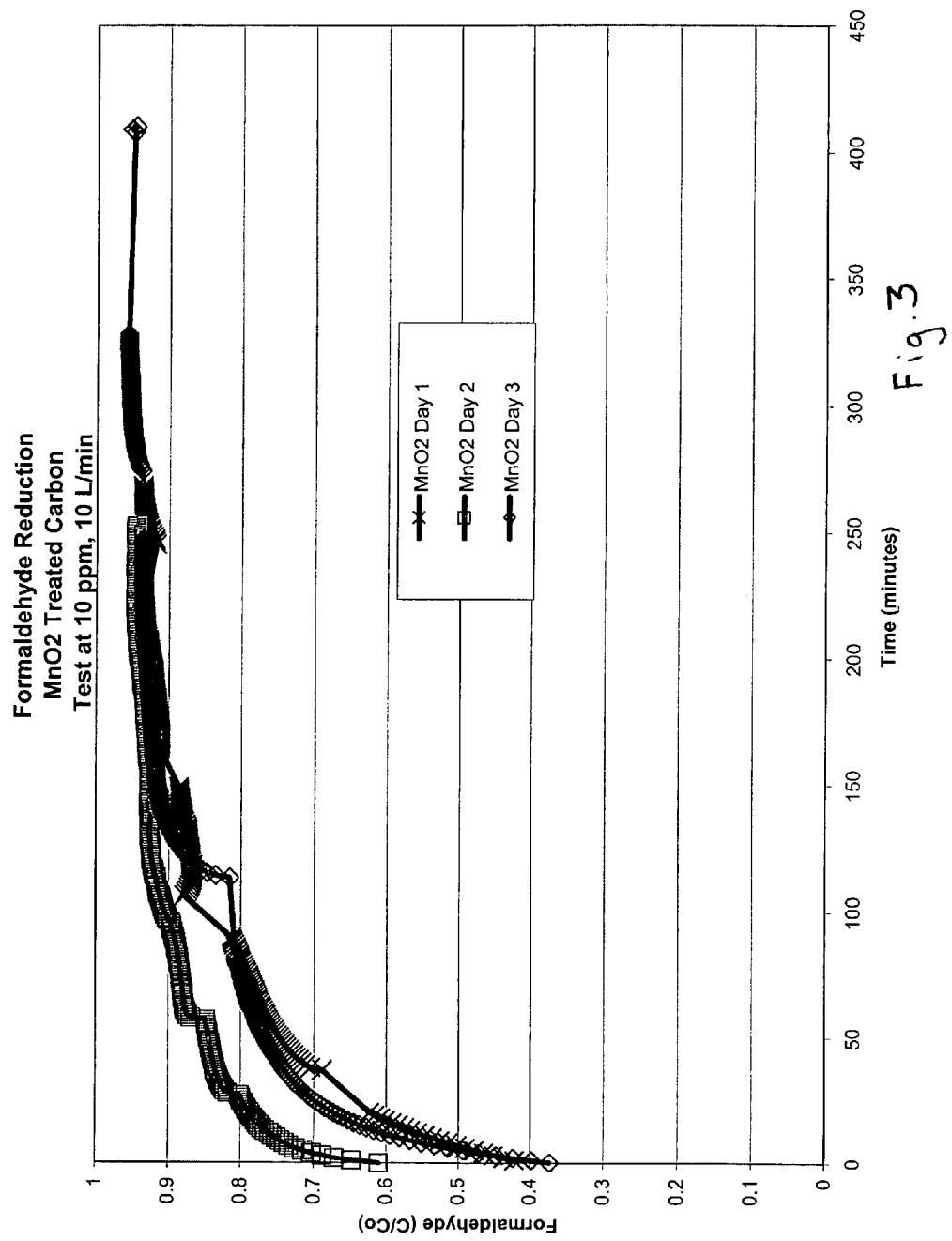
FIG. 3 is a graph showing formaldehyde reduction performance of manganese dioxide/potassium hydroxide carbon granules of the filter.
Figure 4:
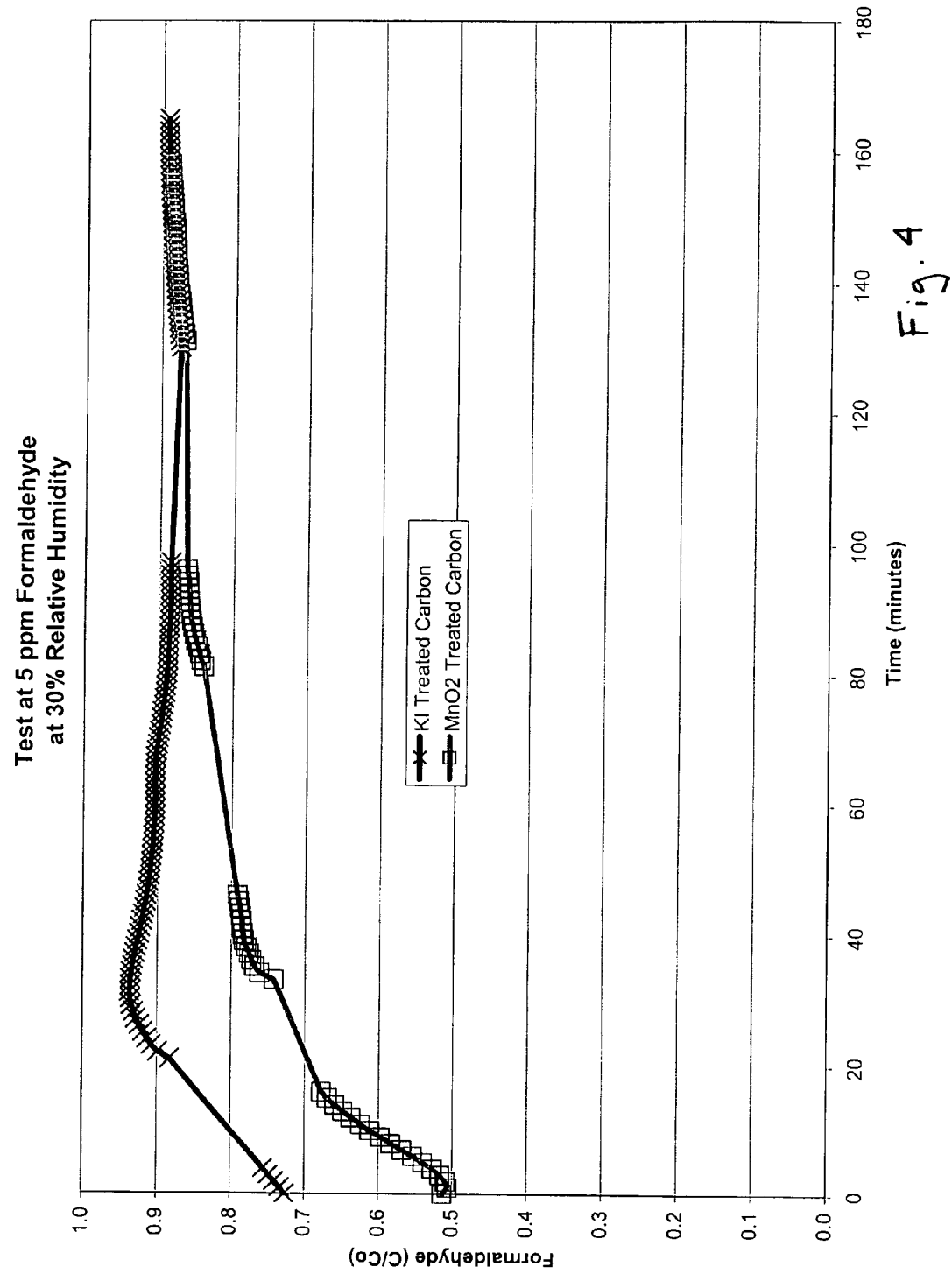
FIG. 4 is a graph showing comparative formaldehyde reduction performance of both potassium iodide/potassium hydroxide carbon granules and manganese dioxide/potassium hydroxide carbon granules of the filter.

After four runs for each carbon type, it was determined that the performance of the carbons was remaining steady. The performance of the manganese dioxide/potassium hydroxide generally was better than the potassium iodide/potassium hydroxide carbon type at the beginning of each run, but they both leveled out at about a 90% breakthrough each run. This indicated that the performance of both materials was catalytic because activated carbon has a very limited adsorption capacity for formaldehyde. If the mechanism for reducing formaldehyde with the carbon types was only adsorption, the performance of the carbon would quickly drop as the capacity of the carbon was exceeded. This data is presented in FIGS. 2-3, with each of the carbon types presented separately in each of the respective figures. In FIG. 4, carbon granule types were run at 5 ppm formaldehyde to illustrate the differences between the two different granule types and formaldehyde reduction. There, the KI/KOH treated carbon performed better at the relatively higher humidity of 30%.

EXAMPLE 2

Figure 5:
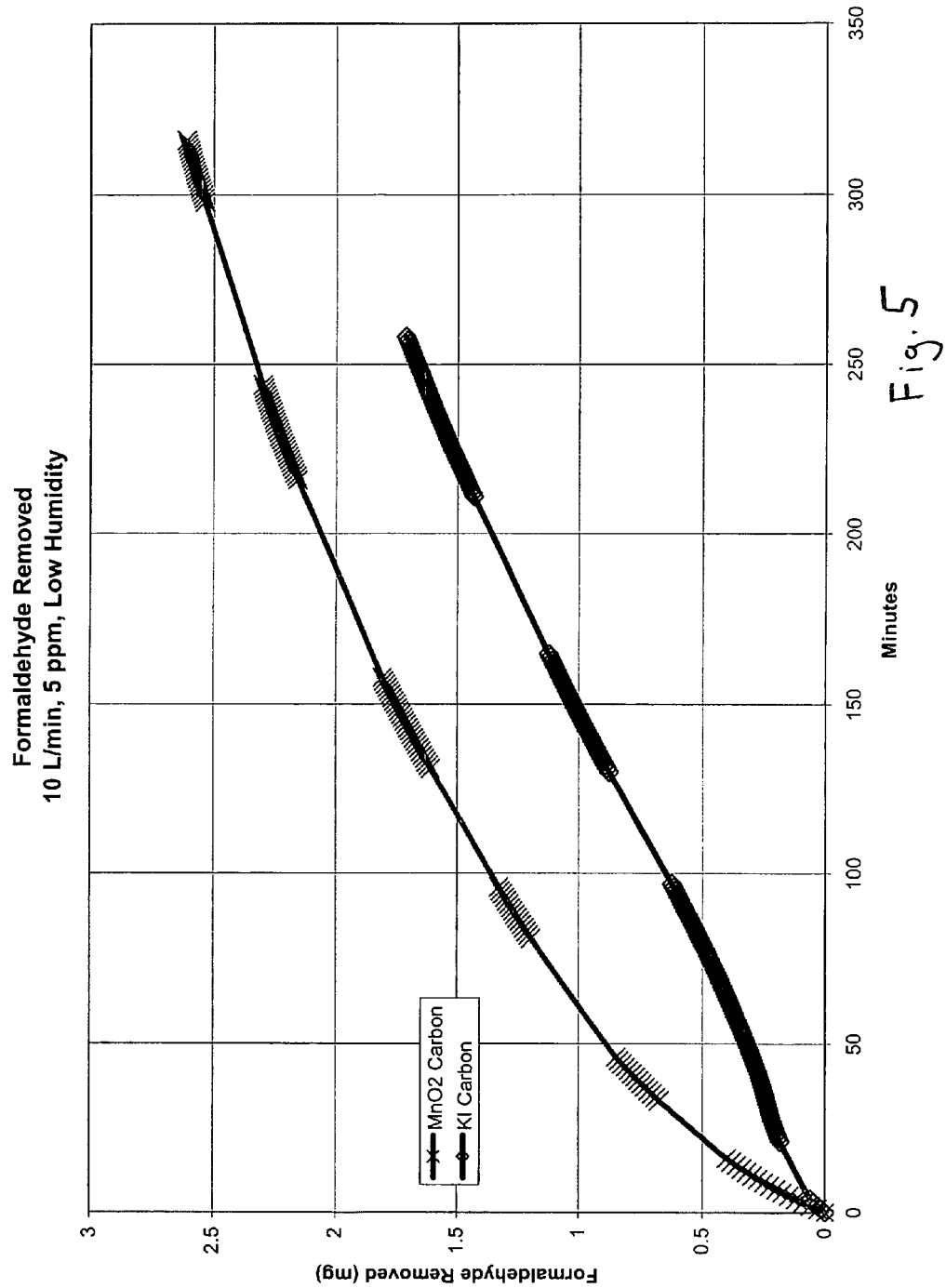
FIG. 5 is a graph showing comparative formaldehyde reduction performance of both potassium iodide/potassium hydroxide carbon granules and manganese dioxide/potassium hydroxide carbon granules of the filter at a low humidity.

A manganese dioxide/potassium hydroxide carbon type and potassium iodide/potassium hydroxide carbon type were prepared according to that in Example 1 and compared for performance at a low humidity. Specifically, an air steam having 5 ppm formaldehyde at 10 liters per minute and a relative humidity of about 10% was treated with each of the columns. The results of the test illustrated that the potassium iodide/potassium hydroxide carbon type oxidizes about 50% less formaldehyde than the manganese dioxide/potassium hydroxide carbon type during the first 100 minutes of the study and that the performance of each is parallel for the remainder of the study as illustrated in FIG. 5.

EXAMPLE 3

Figure 6:
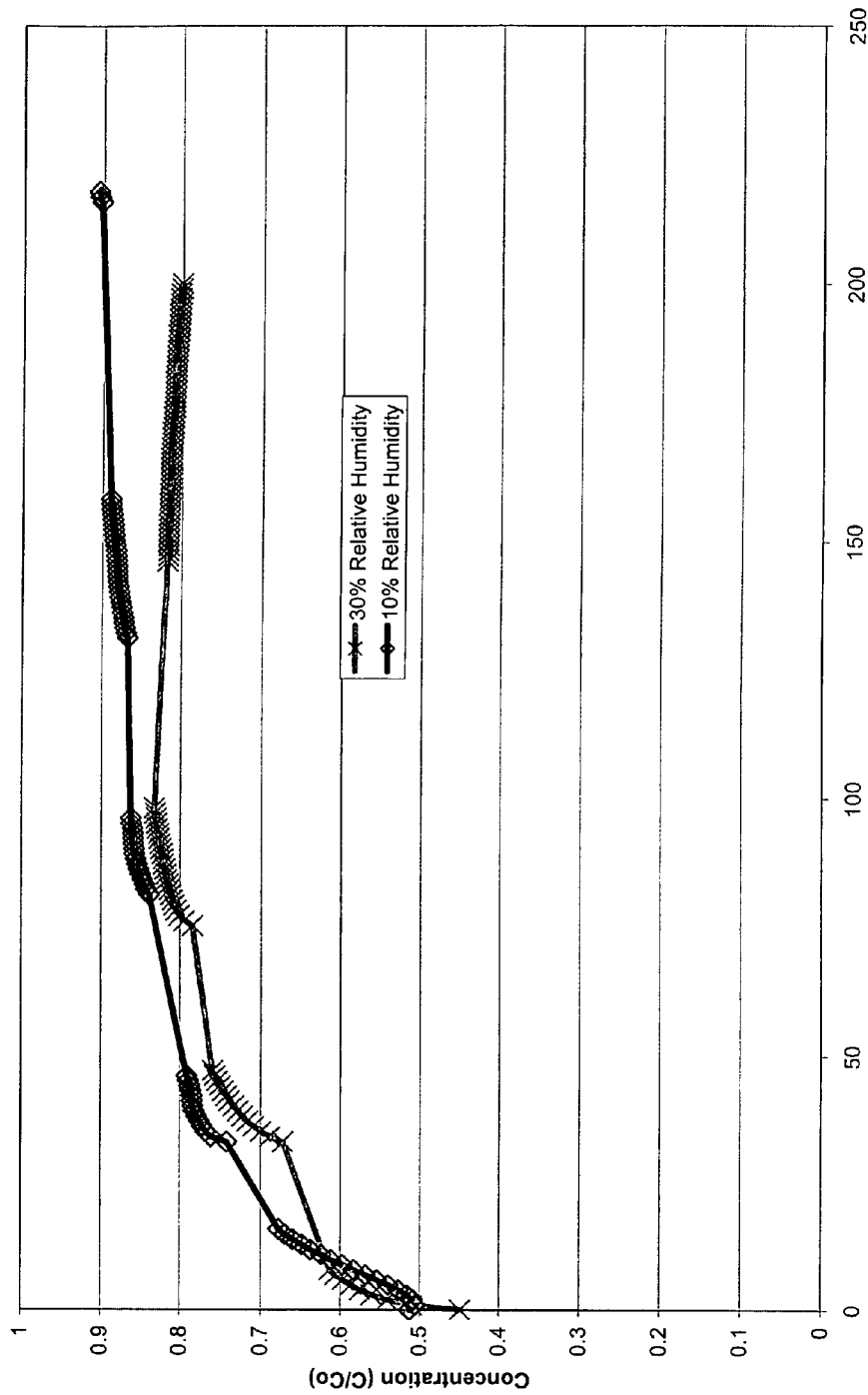
FIG. 6 is a graph showing formaldehyde reduction performance of the manganese dioxide/potassium hydroxide carbon granules of the filter and the effect thereon by different relative humidity.

A manganese dioxide/potassium hydroxide carbon type was prepared according to that in Example 1. In this test, the performance of the manganese dioxide carbon type was tested at varying humidity. Specifically, the manganese dioxide/potassium hydroxide carbon type minicolumn was prepared as in Example 1 and subjected to an air stream having a 5 ppm formaldehyde concentration at 10% relative humidity and 30% relative humidity. The results of this test are illustrated in FIG. 6, which illustrates that the ability of manganese dioxide/potassium hydroxide carbon type to catalyze formaldehyde is slightly better within a low humidity range than higher humidity range.

Figure 7:
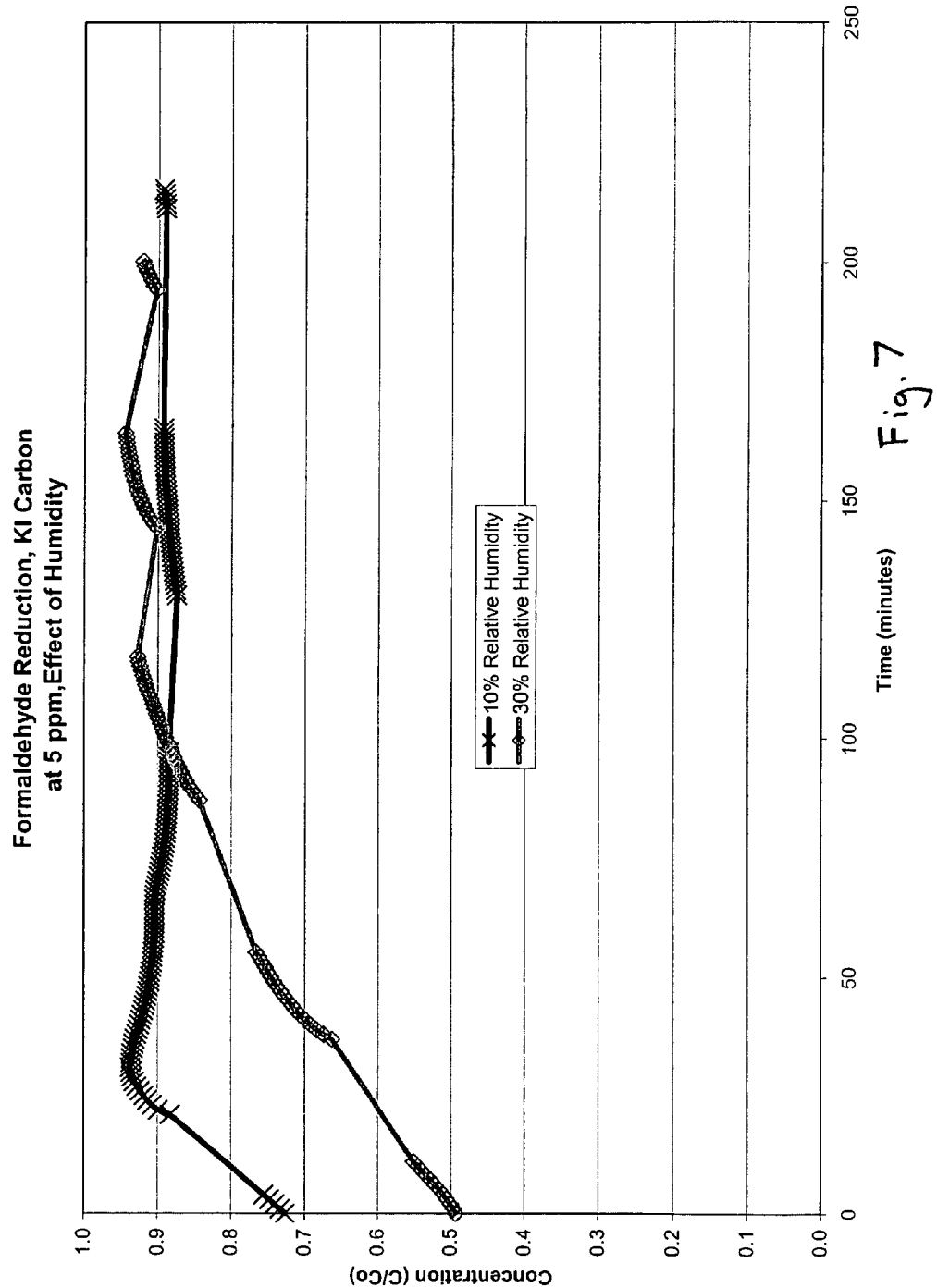
FIG. 7 is a graph showing formaldehyde reduction performance of the potassium iodide/potassium hydroxide carbon granules of the filter and the effect thereon by different relative humidity.

Additionally, a potassium iodide/potassium hydroxide carbon type was prepared according to that in Example 1 and also subjected to an air stream having a 5 ppm formaldehyde concentration at 10% relative humidity and 30% relative humidity. The results of this test are illustrated in FIG. 7, which illustrates that the ability of potassium iodide/potassium hydroxide carbon type to catalyze formaldehyde improves within a higher humidity range, but still operates well within a lower humidity range.

EXAMPLE 4

Figure 8:
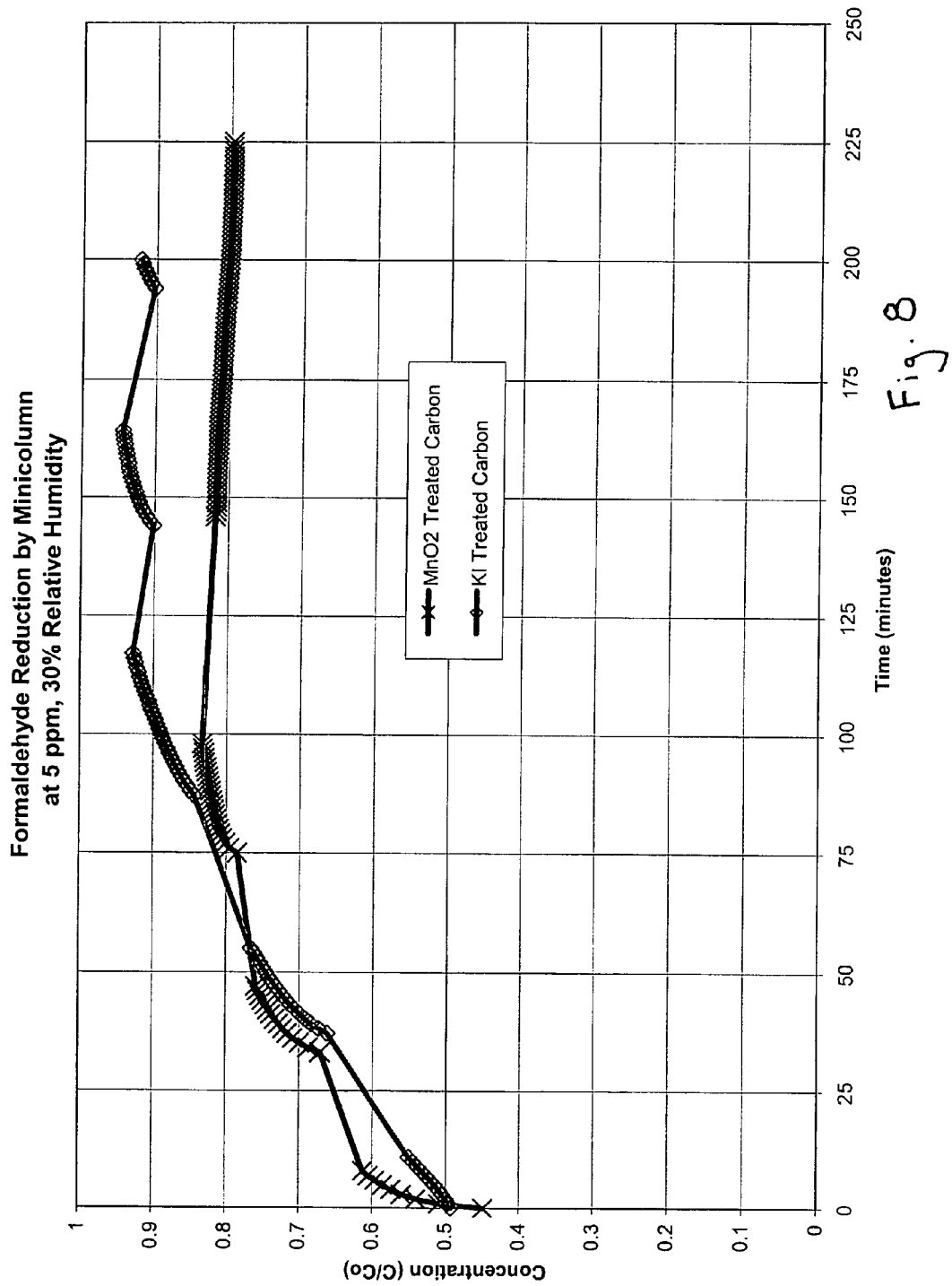
FIG. 8 is a graph showing comparative formaldehyde reduction performance of both potassium iodide/potassium hydroxide carbon granules and manganese dioxide/potassium hydroxide carbon granule of the filter at a higher relative humidity.

To further explore the performance difference between the potassium iodide/potassium hydroxide carbon type and the manganese dioxide/potassium hydroxide carbon type, both carbon types, as prepared according to Example 1, were tested at a higher humidity, that is, 30% relative humidity. The results of this test are illustrated in FIG. 8, which illustrates that the potassium iodide/potassium hydroxide carbon performs better than the manganese dioxide/potassium hydroxide carbon at the higher relative humidity.

Figure 9:
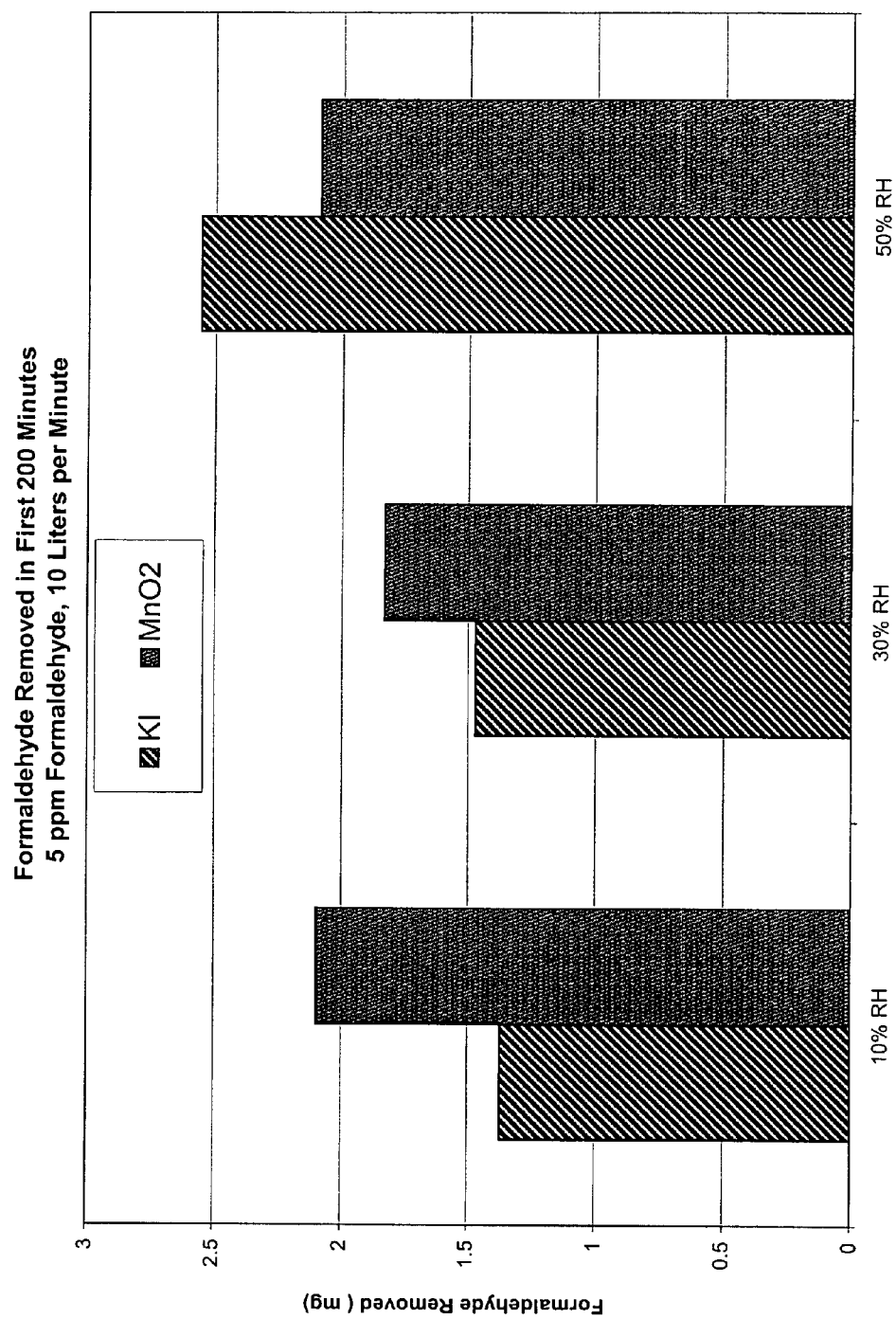
FIG. 9 is a bar graph showing comparative formaldehyde reduction performance of both potassium iodide/potassium hydroxide carbon granules and manganese dioxide/potassium hydroxide carbon granule of the filter across varying humidity.

In an even more comprehensive comparison, the performance difference between both carbon types, as prepared according to Example 1, were tested at low (10% relative humidity), higher (30% relative humidity), and even higher (about 50% relative humidity) humidity, using 5 ppm formaldehyde at 10 liters per minute over the first 200 minutes. The results of this test are illustrated in FIG. 9 and in Table I below, which illustrate that at lower humidity, the manganese dioxide/potassium hydroxide carbon catalyzes more formaldehyde than the potassium iodide/potassium carbon, but as the humidity rises, the potassium iodide/potassium carbon functions to better catalyze the formaldehyde than the manganese dioxide/potassium hydroxide carbon. One observed benefit from this is that the two carbons compliment one another to remove formaldehyde over a spectrum of humidity.

TABLE I

Milligrams Formaldehyde Removed At Varying Humidity

| Rel. Hum. | Mgs. Form. Removed with KI | Mgs. Form. Removed with MnO$_2$ |
|---|---|---|
| 10% | 1.37 | 2.1 |
| 30% | 1.47 | 1.8 |
| 50% | 2.56 | 2.1 |

EXAMPLE 5

A carbon filter including the three granule types, that is, those granules supporting manganese dioxide and potassium hydroxide, those granules supporting potassium iodide and potassium hydroxide, and those granules supporting phosphoric acid, was tested at three different humidities to further demonstrate performance over a wide range of conditions. Specifically, carbon filters, each containing about 4.1 pounds (1900 grams) of a carbon blend shown in Table II below, were tested for reduction of a continuous formaldehyde emission. The mass distribution in grams of the carbon, chemisorbants and catalysts on the carbon for the Carbon Blend Air Filter is shown in Table III. These amounts can vary in proportion to one another as desired.

TABLE II

Carbon Blend for Air Filter

| | |
|---|---|
| Activated Carbon Loaded with 4% KMnO$_4$, 7.5% KOH | 33.33% |
| Activated Carbon Loaded with 6.5% KI, 7.5% KOH | 33.33% |
| Activated Carbon Loaded with 15% H$_3$PO$_4$ | 33.33% |

TABLE III

Mass Distribution of the Carbon Blend Air Filter

| | |
|---|---|
| KOH | 70.6 g |
| H$_3$PO$_4$ | 94.1 g |
| KI | 12.6 g |
| MnO$_2$ | 23.6 g |
| Total | 200.7 g |
| Total Carbon | 1900 g |

An air treatment system including the filter having the Carbon Blend in Table II was placed in a tightly sealed Association of Home Appliance Manufacturers (AHAM) room having a volume of 31 cubic meters. It was noted that the natural decay of a contaminant in the room was typically less than 7% per hour, due to small air leaks. The air in the room was well mixed by the use of fans.

Testing was conducted to determine efficiency in full size systems. The air path consisted of a coarse pre-filter 30, a HEPA filter 40, followed by the activated carbon filter 50 including the Carbon Blend of Table II. The carbon filter measured 23 inches, by 12 inches, and 1 inch deep. It contained about 1900 grams of the carbon blend. The air flowrate was 7.08 cubic meters per minute.

A formalin solution at a concentration of 1 milligram per milliliter was made by dissolving paraformaldehyde in water. The formalin was metered into the room by a HPLC (high pressure liquid chromatography) pump, at a constant rate of greater than 2.25 milligrams per hour. The formalin was passed through an aspirator, which immediately vaporized it in the room.

The formaldehyde concentration in the room was monitored with a fourier transform infrared spectrophotometer equipped with a 24.7 meter gas cell. Such a spectrophotometer is commercially available under the model, Nicolet Antaris, from Thermo Electron Corporation of Madison, Wis.

The filters were acclimated to the humidity for a minimum 24 hours before testing. This allowed the activated carbon to adsorb water and come to equilibrium with the testing humidity. Before the performance tests, a test of the formalin pumping system also was conducted. This tested the linear rise in the concentration of formaldehyde in the room, with no air treatment system in the room. The pumping rate was 0.04 ml per minute of a formalin solution containing 1 mg of formaldehyde per milliliter, resulting in a pumping rate of 2.4 mg of formaldehyde per hour. The HPLC pump was started and the formaldehyde concentration in the room was monitored for a minimum of 90 minutes. The rise in concentration was equivalent to the formaldehyde injected into the room, minus the small loses due to natural decay described above. The very uniform and accurate pumping rate of the HPLC pump was demonstrated by a linear rise in the formaldehyde concentration. Measurements were taken every 5 minutes, and based on the slope of the line, the concentration increased at a rate of 0.0763 ppm per hour.

The medium humidity in the room was achieved using ambient conditions. The high humidity in the room was achieved by using a ultrasonic nebulizer humidifier, on an on/off timer, set at 1 minute on and 14 minutes off. The low humidity was achieved by treating the air in the room by passing it through a bed of anhydrous calcium sulphate. The resulting relative humidities were 30%, 43% and 75%, for the low, medium and high humidities, respectively.

Figure 10:
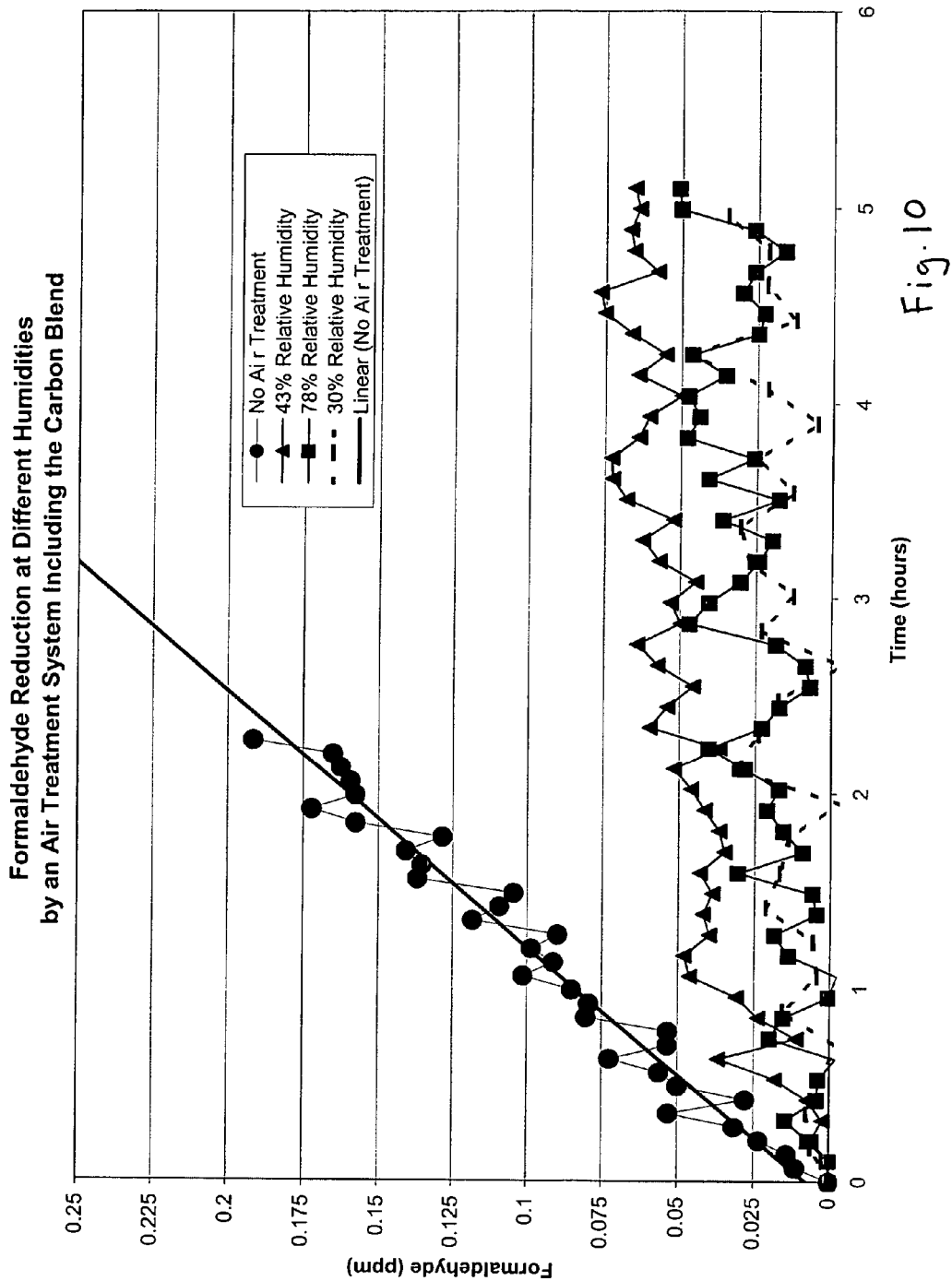
FIG. 10 is a graph showing formaldehyde reduction performance of the carbon filter including a combination of potassium iodide/potassium hydroxide carbon granules, manganese dioxide/potassium hydroxide carbon granules and phosphoric acid carbon granules at varying humidity.

The results of this testing is shown at FIG. 10. There, it is shown that the filter including the Carbon Blend reduced formaldehyde from the effluent with extraordinary efficiency across the spectrum of tested humidity. Indeed, when compared to the projected increase of formaldehyde with no air treatment, the filter performed very well. The results at these varying humidity is surprising given the relatively small volume of the beds. It is estimated that a conventional filter bed would have required two to three times the volume to treat the contaminants effectively. Moreover, it was noted that the typical formic acid byproduct of formaldehyde oxidation was present in very low amounts, for example, around zero ppm, as further described in Example 8.

EXAMPLE 6

The carbon filter manufactured in Example 5 was also tested in room-like environments using an air treatment system to confirm the filter's treatment of a group of odors from low molecular weight carboxylic acids in foods and body odors. Due to it being a low molecular weight carboxylic acid, its relatively low toxicity in the dilute vapor phase, and its tolerable odor, acetic acid was used for this testing. The reported detection limits of acetic acid for humans are reported to be about 1-100 ppb. The OSHA Permissible Exposure Limit (PEL) for acetic acid, is 10 ppm (TWA). The ACGIH Threshold Limit Value (TLV) is 10 ppm and 15 ppm (STEL).

In general, preparation of a filter for testing was performed by acclimating the filter to humidity by running it in an air treatment system at turbo speed for 48 hours minimum at a relative humidity that was similar to the testing conditions. This allowed the carbon to come to equilibrium with the humidity. It also allowed the potassium hydroxide to react with carbon dioxide in the air, and convert to potassium carbonate. This pre-saturation of the potassium hydroxide lowered the performance of the filter to what would be expected in normal use.

A solution of acetic acid, 500 grams per liter, was made in a volumetric flask, and this solution was primed in the HPLC pump to the inside of the AHAM chamber. The pump was set to 0.4 ml per minute, which is equal to 200 miligrams (3.33 millimoles) of acetic acid per minute. Attached to the HPLC pump was a 10 inch long stainless steel tube which was within a heater. The heater comprised silicone rubber resistance heaters, with a temperature control set at about 250 to about 270 degrees Farenheit. The purpose of this was to boil the water and acetic acid immediately to form a vapor in the room.

A photoionization detector (PID), specifically a MiniRAE 2000, available from RAE Systems of San Jose, Calif., was also used in the testing to detect the acetic acid. The detector was calibrated within 4 days of each run, using 100 ppm isobutylene. A response factor of 22 was entered into the detector, for the conversion to acetic acid. The detector was programmed to take a data point every minute.

Actual testing began by placing the volumetric flask on a balance and taring it. Thereafter, the solution of acetic acid was flask was primed in the HPLC pump to the inside of the AHAM chamber as described above. The PID was placed in the AHAM, along with an air treatment system including the carbon filter described above. A suitable air treatment system is the Atmosphere®, manufactured by Access Business Group of Ada, Mich. The room was sealed. The tubing heater described above was activated, and within 5 minutes the tubing was at 250 degrees Farenheit. The PID detector and the HPLC pump were started, and the start time was recorded along with the temperature and relative humidity in the room. At the end of one hour the air treatment system was activated to turbo speed, 7.08 cubic meters per minute. Testing was conducted for the next six hours. At the end of the test, the heater, pump, PID detector and air treatment system were turned off. The temperature in the room was about 68° F. to about 69° F., and the relative humidity was about 26% to about 28% throughout the test. The room was ventilated, and the data from the PID detector as well as the weight loss in the HPLC reservoir was downloaded and input to a spreadsheet.

Figure 11:
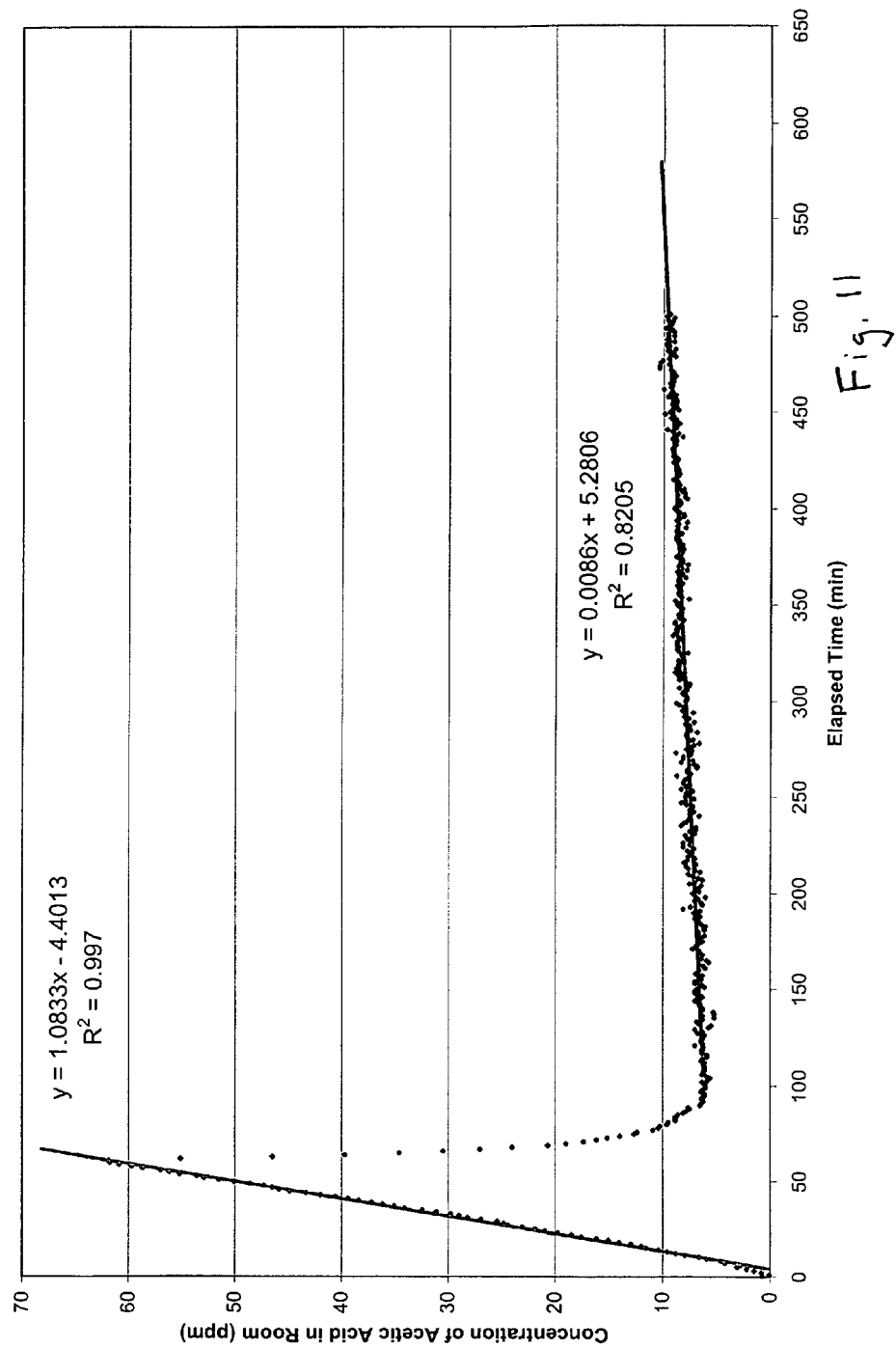
FIG. 11 is a graph showing acidic gas reduction performance of the carbon filter including a combination of potassium iodide/potassium hydroxide carbon granules, manganese dioxide/potassium hydroxide carbon granules and phosphoric acid carbon granules.

The graph at FIG. 11 shows the test results for testing of the carbon filter prepared in Example 5, which included the Carbon Blend. The first straight line (slope=1.0833 ppm/minute) represents the acetic acid added to the room, minus the natural decay. The second straight line (slope=0.0086 ppm/minute) represents the performance of the system in the test. The graph demonstrates that the performance in the first 60 minutes of the start of the ATS was significantly different than the performance through the rest of the test. The performance change at about 100 minutes shows when the exterior of the carbon particles was nearing saturation, and further performance was limited by intraparticle diffusion.

It was noted that the MiniRAE 2000 PID introduced data scatter when the concentration was not rising or falling quickly. Acetic acid has an ionization potential of 22. The minimum increments in the output of the PID detector is 0.1, which was then converted to 2.2 for acetic acid. When the detector was operating in a mode where the instrument was toggling between two values, it was converted to toggling in increments of 2.2 ppm.

The equation for the best fit line allows extrapolation of the concentration in the room at 350 minutes, without an air treatment system. As shown in Table IV, the Carbon Blend carbon filter removed a significant amount of acetic acid.

TABLE IV

| System | Concentration of Acetic Acid ppm at 350 minutes |
|---|---|
| No Air Treatment System | 374.8 |
| Air Treatment System with Carbon Blend (average of 2 tested units) | 8.8 |

EXAMPLE 7

The carbon filter manufactured in Example 5 was further tested in room-like environments using an air treatment system to confirm the filter's treatment of a group of odors from low molecular weight amines, found in seafood, feces, pet odors, and body odors. Due to its relatively low toxicity in the dilute vapor phase, and its tolerable odor at low concentrations, ammonia was used for this testing. The reported detection limits for humans are reported to be about 1 ppm. The OSHA Permissible Exposure Limit (PEL) for ammonia is 50 ppm (TWA). The ACGIH Threshold Limit Value (TLV) is 25 ppm and 35 ppm (STEL).

In general, preparation of a filter for testing was performed by acclimating the filter to humidity by running it in an air treatment system at turbo speed for 48 hours minimum at a relative humidity that was similar to the testing conditions. This allowed the carbon to come to equilibrium with the humidity. It also allowed the potassium hydroxide to react with carbon dioxide in the air, and convert to potassium carbonate. This pre-saturation of the potassium hydroxide lowered the performance of the filter to what would be expected in normal use.

A solution of acetic acid, 253 grams per liter of 28-29% ammonium hydroxide, was made in a volumetric flask, and this solution was primed in the HPLC pump to the inside of the AHAM chamber. The pump was set to 0.4 ml per minute, which is equal to 28.36 milligrams (1.65 millimoles) of ammonia per minute. Attached to the HPLC pump was a 10 inch long stainless steel tube which was within a heater. The heater comprised silicone rubber resistance heaters, with a temperature control set at about 250 to about 270 degrees Farenheit. The purpose of this was to boil the water and ammonia immediately to form a vapor in the room.

The MiniRAE 2000 PID was also used in the testing to detect the ammonia. The detector was calibrated within 4 days of each run, using 100 ppm isobutylene. A response factor of 9.7 was entered into the detector, for the conversion to ammonia. The detector was programmed to take a data point every minute.

Actual testing began by placing the volumetric flask on a balance and taring it. Thereafter, the solution of acetic acid was flask was primed in the HPLC pump to the inside of the AHAM chamber as described above. The PID was placed in the AHAM, along with an air treatment system including the carbon filter described above. The room was sealed. The tubing heater described above was activated, and within 5 minutes the tubing was at 250 degrees Farenheit. The PID detector and the HPLC pump were started, and the start time was recorded along with the temperature and relative humidity in the room. At the end of one hour the air treatment system was activated to turbo speed. Testing was conducted for the next six hours. At the end of the test, the heater, pump, PID detector and air treatment system were turned off. The temperature in the room was about 69° F. to about 70° F., and humidity was about 25% to about 26% throughout the test. The room was ventilated, and the data from the PID detector, as well as the weight loss in the HPLC reservoir was downloaded and input to a spreadsheet.

Figure 12:
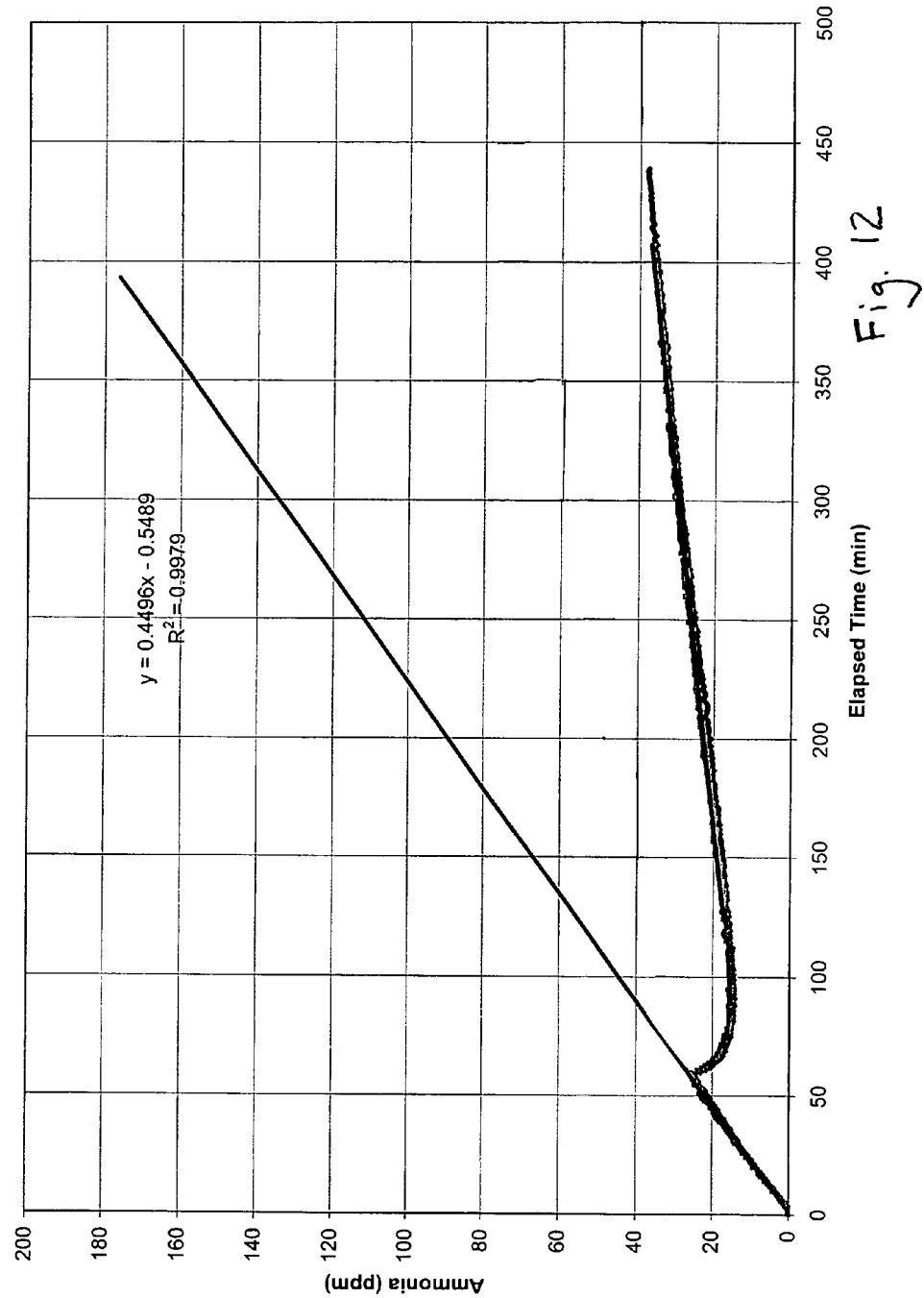
FIG. 12 is a graph showing alkaline gas reduction performance of the carbon filter including a combination of potassium iodide/potassium hydroxide carbon granules, manganese dioxide/potassium hydroxide carbon granules and phosphoric acid carbon granules.

The graph at FIG. 12 shows the test results for testing of the carbon filter prepared in Example 5, which included the Carbon Blend. The first straight line (slope=0.4496 ppm/minute) represents the ammonia added to the room, minus the natural decay. The second straight line below that line represents the performance of the system in the test. The graph demonstrates that the performance in the first 100 minutes of the start of the ATS was significantly different than the performance through the rest of the test. The performance change at about 100 minutes shows when the exterior of the carbon particles was nearing saturation, and further performance was limited by intraparticle diffusion.

The equation for the first straight line allows extrapolation of the concentration in the room at 350 minutes, without an air treatment system. As shown in Table V, the Carbon Blend carbon filter removed a significant amount of ammonia.

TABLE V

| System | Concentration of Ammonia ppm at 350 minutes |
|---|---|
| No Air Treatment System | 156.8 |
| Air Treatment System with Carbon Blend (average of 2 tested units) | 32.6 |

EXAMPLE 8

Figure 13:
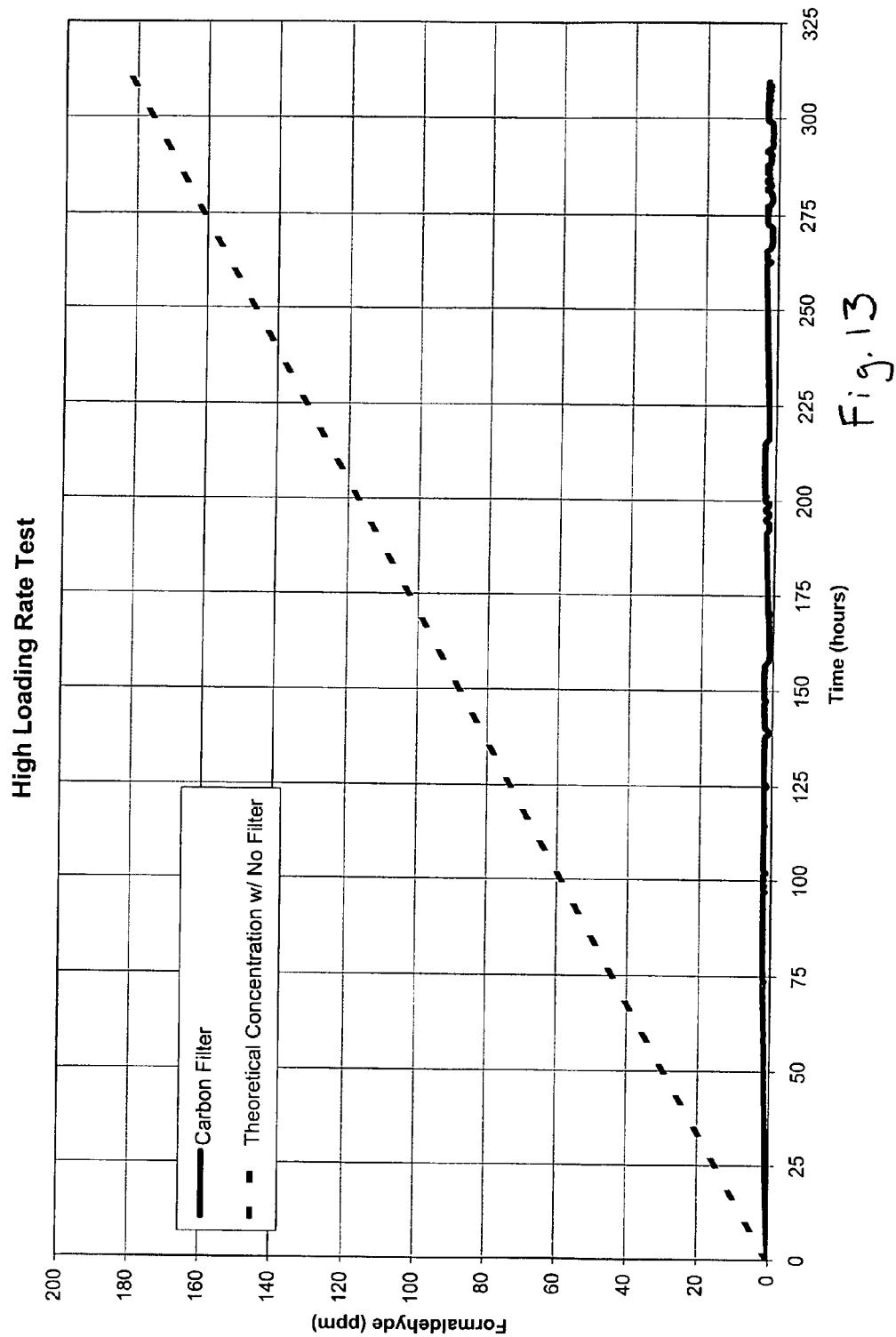
FIG. 13 is a graph showing high level formaldehyde reduction using the carbon filter in conjunction with formic acid detection testing.

The carbon filter manufactured in Example 5 was further tested in room-like environments using an air treatment system described above to confirm the filter's ability to remove formic acid, which is a potential by-product from the oxidation of formaldehyde. To demonstrate that the filter had performance over an extended period of time, a study was run at a significantly higher level of formaldehyde, for an extended period of time. The filter, air treatment system and testing room were identical to those described in Example 5. In Example 5, the injection rate for the formaldehyde was 2.2 mg per hour. In this test the injection rate was raised to 18.23 mg per hour, from a 10 mg per milliliter formalin solution, and the test continued for 310 hours. FIG. 13 shows the performance of the filter over the extended period of time. All measurements of the formaldehyde in the testing room were below 3.5 ppm.

As noted above, formic acid is a potential by-product from the oxidation of formaldehyde. At 150 hours and 300 hours in the study the air was tested for formic acid. At the 150 hour point, the theoretical concentration of formaldehyde in the room was 88 ppm, and the actual concentration was 2.4 ppm, and no formic acid was detected. At the 300 hour point in the study, the theoretical concentration of formaldehyde in the room was 176 ppm, and the actual concentration was 2.8 ppm, and no formic acid was detected. Therefore, it was concluded that the filter was effective at sufficiently removing the formic acid by product of formaldehyde oxidation. Incidentally, the formic acid was measured with a Drager Colorimetric Tubes, available from Drager Safety Incorporated, Eighty Four, PA., which have a minimum detection limit of 1 ppm.

The above descriptions are those of the current embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. An activated carbon filter adapted to treat a gas stream having a varying relative humidity comprising:
   a first plurality of carbon granules, each granule supporting both manganese dioxide and potassium hydroxide, the manganese dioxide on the first plurality of carbon granules being a primary catalyst for oxidation of a contaminant in the gas stream when the gas stream has a relative humidity of greater than about 5%, but less than about 30%;

a second plurality of carbon granules, each granule supporting both potassium iodide and potassium hydroxide, the potassium iodide on the second plurality of carbon granules being a primary catalyst for oxidation of the contaminant in the gas stream when the gas stream has a relative humidity of greater than about 30%; and a third plurality of carbon granules, each granule supporting phosphoric acid, the phosphoric acid on the third plurality of granules adapted to remove at least one alkaline gas from the gas stream, wherein the first, second and third plurality of granules are mixed together in a carbon granule bed.

2. The activated carbon filter of claim 1 wherein the contaminant is at least one of formaldehyde, acetaldehyde, low molecular weight alcohols, low molecular weight aldehydes, and low molecular weight carboxylic acids.

3. The activated carbon filter of claim 1 wherein the individual granules of the first, second, and third plurality of carbon granules each have an average diameter of about 3 mm.

4. The activated carbon filter of claim 1 wherein the first, second, and third plurality of carbon granules have a cumulative weight of about 1500 grams to about 2000 grams.

5. The activated carbon filter of claim 4 wherein the first, second, and third plurality of carbon granules have a cumulative weight of about 1900 grams.

6. The activated carbon filter of claim 1 wherein the first, second and third plurality of carbon granules are present in about equal amounts in the carbon granule bed.

7. An activated carbon filter adapted to treat a gas stream having a varying relative humidity comprising:

a plurality of activated carbon granules mixed together in a carbon bed, wherein a first portion of the granules is modified so that individual granules support both manganese dioxide and potassium hydroxide, the manganese dioxide being a primary catalyst for oxidation of formaldehyde in the gas stream to formic acid when the gas stream has a relative humidity of greater than about 5%, but less than about 30%, the potassium hydroxide being a chemisorbant of the formic acid, wherein a second portion of the granules is modified so that individual granules support both potassium iodide and potassium hydroxide, the potassium iodide being a primary catalyst for oxidation of formaldehyde in the gas stream to formic acid when the gas stream has a relative humidity of greater than about 30%, the potassium hydroxide being a chemisorbant of the formic acid, and wherein a third portion of the granules is modified so that individual granules support phosphoric acid that is adapted to remove at least one alkaline gas from the gas stream.

8. The activated carbon filter of claim 7 wherein the first, second and third portions are present in equal amounts in the carbon bed.

9. The activated carbon filter of claim 8 wherein the first, second and third portions each comprise about a third of the carbon granules present in the carbon bed.

10. The activated carbon filter of claim 7 wherein the manganese dioxide on the first portion operates as a catalyst to oxidize more formaldehyde in the gas stream than the potassium iodide on the second portion when the gas stream has a relative humidity of about greater than about 9%, but less than about 15%.

11. The activated carbon filter of claim 7 wherein the potassium iodide on the second portion operates as a catalyst to oxidize more formaldehyde in the gas stream than the manganese dioxide on the first portion when the gas stream has a relative humidity of greater than about 30%.

12. The activated carbon filter of claim 7 wherein the first, second and third portions of carbon granules have a cumulative weight of about 1900 grams.

13. The activated carbon filter of claim 7 wherein the individual granules of the first, second and third portions of carbon granules each have an average diameter of about 3 mm.

14. An activated carbon filter adapted to treat a gas stream comprising:

a first element including a first plurality of carbon granules that individually support both manganese dioxide and potassium hydroxide; and a second element including a second plurality of carbon granules that individually support both potassium iodide and potassium hydroxide, wherein the first element is proximate the second element, wherein the first element is upstream of the second element relative to a path of the gas stream.

15. The activated carbon filter of claim 14 comprising a third element including a third plurality of carbon granules, each granule supporting phosphoric acid adapted to remove at least one alkaline gas from the gas stream, wherein the third element is downstream of the first element.

16. A method for treating a gas stream with a granular activated carbon filter comprising:

providing a plurality of activated carbon granules mixed together in a carbon bed filter, a first portion of the granules supporting both manganese dioxide and potassium hydroxide, a second portion of the granules supporting both potassium iodide and potassium hydroxide, and a third portion of the granules supporting phosphoric acid;

subjecting a gas stream having a varying relative humidity, the gas stream contaminated with at least one of formaldehyde, an acid gas and an alkaline gas, to the carbon bed filter;

catalyzing the oxidation of the formaldehyde to a carboxylic acid primarily with the manganese dioxide supported by the first portion of the granules when the gas stream has a relative humidity of greater than about 5% but less than about 30%;

chemisorbing the carboxylic acid with the potassium hydroxide supported by the first portion of the granules;

catalyzing the oxidation of the formaldehyde to a carboxylic acid primarily with the potassium iodide supported by the second portion of the granules when the gas stream has a relative humidity of greater than about 30%;

chemisorbing at least a portion of the carboxylic acid with the potassium hydroxide supported by the second portion of the granules;

removing the acidic gas from the gas stream with the potassium hydroxide supported by the first portion and the second portion of the granules; and removing the alkaline gas from gas stream with the phosphoric acid supported by the third portion of the granules.

17. The method of claim 16 wherein the carboxylic acid is formic acid.

18. The method of claim 16 wherein the catalyzing the oxidation of the formaldehyde to a carboxylic acid primarily with the potassium hydroxide occurs at a greater rate than the catalyzing the oxidation of the formaldehyde to a carboxylic acid primarily with the manganese dioxide when the relative humidity of the gas stream is greater than about 30%.

19. The method of claim 16 wherein the catalyzing the oxidation of the formaldehyde to a carboxylic acid primarily with the manganese dioxide occurs at a greater rate than the catalyzing the oxidation of the formaldehyde to a carboxylic acid primarily with the potassium iodide when the relative humidity of the gas stream is greater than about 9%, but less than about 25%.

20. The method of claim 16 wherein the first, second and third portion of granules are present in equal amounts in the carbon bed filter.

21. The method of claim 16 wherein the first, second and third portion of granules each comprise about a third of the granules present in the carbon bed filter.

22. The method of claim 16 comprising drawing the gas stream through the carbon bed filter.

* * * * *